United States Patent
Donabedian et al.

(10) Patent No.: US 10,093,360 B2
(45) Date of Patent: Oct. 9, 2018

(54) VEHICLE ROOF SUPPORT ASSEMBLY

(71) Applicant: FORD GLOBAL TECHNOLOGIES, LLC, Dearborn, MI (US)

(72) Inventors: Edgar Edward Donabedian, Livonia, MI (US); Robert Reiners, Grosse Ile, MI (US); Darrin Neil Wagner, Bloomfield Hills, MI (US); Yu-Kan Hu, Ypsilanti, MI (US); Leonard Anthony Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/417,874

(22) Filed: Jan. 27, 2017

(65) Prior Publication Data
US 2018/0215416 A1    Aug. 2, 2018

(51) Int. Cl.
| | |
|---|---|
| *B62D 25/06* | (2006.01) |
| *B62D 27/02* | (2006.01) |
| *B62D 29/00* | (2006.01) |
| *B62D 21/15* | (2006.01) |

(52) U.S. Cl.
CPC .......... *B62D 25/06* (2013.01); *B62D 21/157* (2013.01); *B62D 27/02* (2013.01); *B62D 29/007* (2013.01); *B60Y 2306/01* (2013.01)

(58) Field of Classification Search
CPC ...... B60D 25/06; B60D 21/157; B60D 27/02; B60D 29/007; B60Y 2306/01
See application file for complete search history.

(56) References Cited

U.S. PATENT DOCUMENTS

| | | | |
|---|---|---|---|
| 5,971,460 A | 10/1999 | Enning | |
| 6,993,878 B2 * | 2/2006 | Prokofyev | E04B 2/14 52/405.1 |
| 7,357,448 B2 | 4/2008 | Chen et al. | |
| 7,543,884 B2 | 6/2009 | Reed et al. | |
| 7,758,107 B2 | 7/2010 | Ratsos et al. | |
| 7,758,109 B2 | 7/2010 | Reed et al. | |
| 8,371,642 B2 | 2/2013 | Baccouche et al. | |
| 9,045,168 B2 | 6/2015 | Wagner et al. | |

(Continued)

FOREIGN PATENT DOCUMENTS

| | | |
|---|---|---|
| DE | 102011122046 A1 | 10/2012 |
| EP | 1454820 A1 | 9/2004 |

*Primary Examiner* — Lori L Lyjak
(74) *Attorney, Agent, or Firm* — Brooks Kushman P.C.

(57) ABSTRACT

A vehicle roof structure assembly includes a mounting bracket having a first aperture disposed therethrough. The vehicle roof structure assembly further includes a roof bow having a longitudinal body portion defining an inner channel. The longitudinal body portion includes a bottom wall having a second aperture axially aligned with the first aperture. The vehicle roof structure assembly further includes an insert block disposed within the inner channel of the roof bow. The insert block defines a third aperture disposed through a thickness of the insert block. The third aperture is axially aligned with the first aperture and the second aperture. The vehicle roof structure assembly further includes a fastener disposed through the first aperture, the second aperture, and the third aperture to rigidly secure the roof bow to the mounting bracket, and to rigidly secure the insert block to the roof bow.

20 Claims, 5 Drawing Sheets

(56) References Cited

U.S. PATENT DOCUMENTS

| | | |
|---|---|---|
| 9,156,500 B2 | 10/2015 | Faruque et al. |
| 2004/0045235 A1* | 3/2004 | Ley .................. E04B 2/965 52/235 |
| 2004/0251707 A1* | 12/2004 | Garska .................. B60J 7/123 296/107.11 |
| 2016/0251038 A1 | 9/2016 | Kawata et al. |
| 2016/0304129 A1 | 10/2016 | Hamdoon et al. |

* cited by examiner

VEHICLE ROOF SUPPORT ASSEMBLY

TECHNICAL FIELD

This disclosure relates generally to vehicle structures, and more particularly to a roof support assembly and side impact structure for a vehicle.

BACKGROUND

Roof bows are attached to vehicle roof structures to strengthen the roof and support the roof rails. Roof support pillars are typically located between the windows and doors of a vehicle. Roof support pillars are frequently identified as A, B, C and in some instances D-Pillars depending on the vehicle style. A B-Pillar is generally located immediately behind the front door of a vehicle and is traditionally used to mount the rear door hinges and associated rear doors. The B-Pillar often plays an important role in determining roof strength and the degree of side impact intrusion.

Passenger vehicle designs are tested for roof strength and side impact strength. Improving side impact strength is often addressed by increasing the section size and the thickness of the structural components of the roof rail. Increasing the section size and thickness of the roof rails adds weight to the vehicle, often adds manufacturing costs, and may reduce visibility below the roof rail.

SUMMARY

A vehicle roof structure assembly includes a mounting bracket having a first aperture disposed therethrough. The mounting bracket is adapted to be secured to a roof region of a vehicle. The vehicle roof structure assembly further includes a roof bow having a longitudinal body portion defining an inner channel. The longitudinal body portion includes a bottom wall having a second aperture disposed therethrough. The roof bow is secured to the mounting bracket such that bottom wall engages the mounting bracket and the second aperture is axially aligned with the first aperture. The vehicle roof structure assembly further includes a reinforcement bracket secured at an inner region to the roof bow, and secured at an outer region to the mounting bracket. The vehicle roof structure assembly further includes an insert block disposed within the inner channel of the roof bow. The insert block defines a third aperture disposed through a thickness of the insert block. The third aperture is axially aligned with the first aperture and the second aperture. The vehicle roof structure assembly further includes a fastener disposed through the first aperture, the second aperture, and the third aperture to rigidly secure the roof bow to the mounting bracket, and to rigidly secure the insert block to the roof bow.

A vehicle roof bow assembly includes a roof bow having a longitudinal body portion defining a substantially hollow inner channel. The longitudinal body portion includes a wall having a first aperture disposed therethrough. The vehicle roof bow assembly further includes an insert block disposed within the inner channel. The insert block defines a second aperture axially aligned with the first aperture.

A method for securing an insert block within an inner channel of a roof bow for a vehicle roof structure assembly includes inserting the insert block within the inner channel. The method further includes forming at least one dimple on an exterior surface of a side wall of the roof bow to effect a deformation on an interior surface of the side wall to inhibit movement of the insert block within the inner channel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
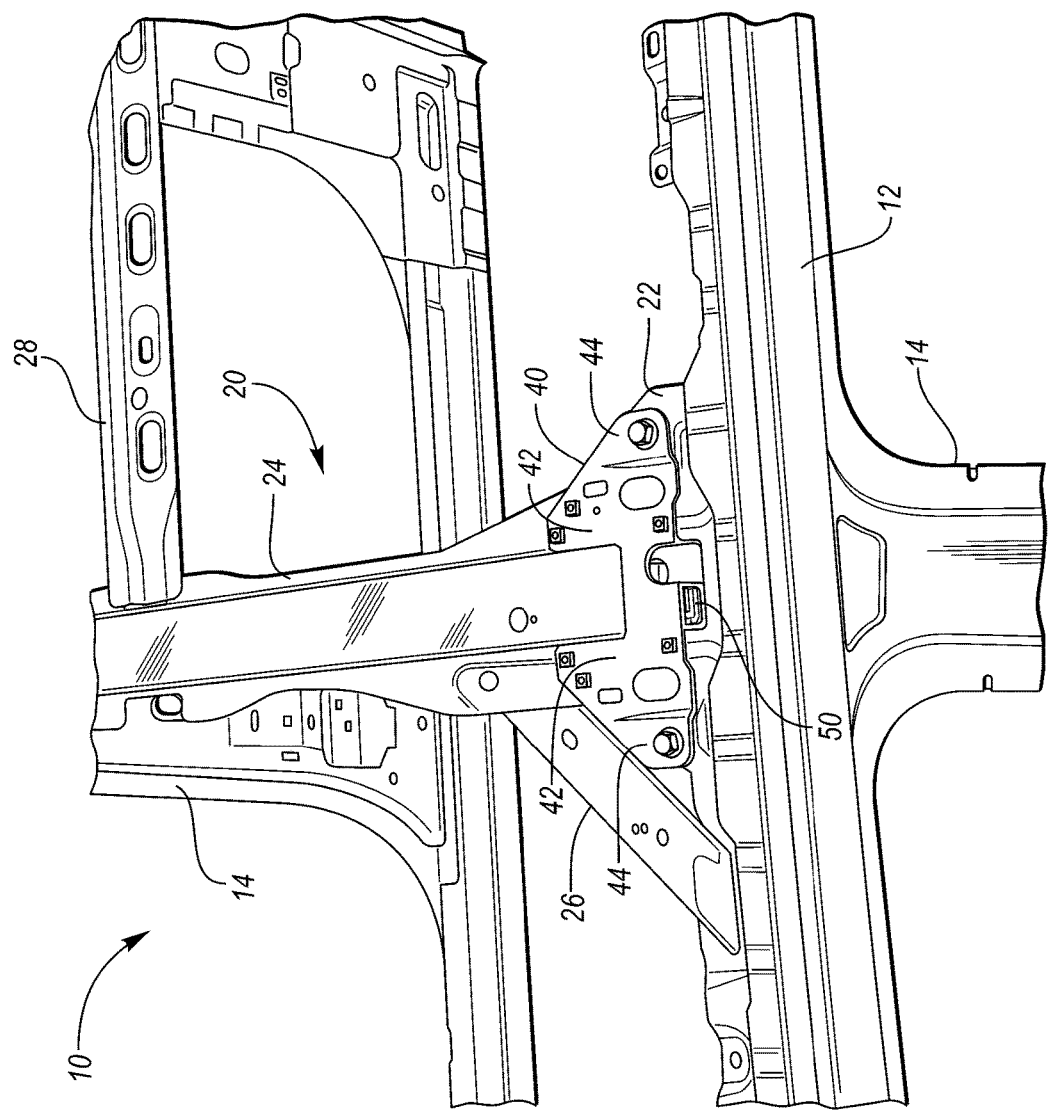
FIG. 1 is a fragmentary perspective view of a vehicle body structure with a roof support assembly structure.

Referring now to FIG. 1, a vehicle body structure 10 is shown for a passenger compartment of a vehicle. The vehicle body structure 10 may be the body shell of the vehicle (also known as the "body-in-white" ("BIW")). The vehicle body structure 10 is often the skeletal structure to which various subsystems are subsequently attached. The vehicle body structure 10 may be a common or shared vehicle platform suitable for various powertrains. For example, a given vehicle body structure 10 may be used for both common internal combustion engine powertrains and alternate powertrains such as diesel or hybrid electric vehicles.

The vehicle body structure 10 includes roof rails 12 and support pillars 14 (e.g., B-Pillars) extending from the roof rails 12.

The vehicle body structure 10 also includes a roof support assembly 20. The roof assembly 20 includes handoff brackets 22 secured to the roof rails 12 adjacent the pillars 14. The handoff brackets 22 are preferably fastened to the roof rails 12 using rivets (e.g., self-piercing rivets). Other suitable fasteners or methods of fastening may be used. The handoff brackets 22 preferably include a receiving channel.

The roof support assembly 20 also includes a roof bow 24 connected to the handoff brackets 22 and extending between the roof rails 12. In a preferred approach, the roof bow 24 is formed of extruded aluminum and may have 3.0 mm thick walls.

The roof bow 24 is secured to a top side of the handoff brackets 22 to support the roof bow 24 between the roof rails 12. In a preferred approach, a body portion (e.g., body portion 30 described elsewhere herein) is disposed within, and secured to, the receiving channel of the handoff bracket 22. The roof bow 24 may also be secured to the handoff bracket 22 at flange portions (e.g., flange portions 32 described elsewhere herein).

The roof bow 24 may also be secured to the roof rails 12 by one or more angled braces 26, also referred to as "K-braces." Each K-brace 26 may be secured at one end to a top side of the roof rail 12, and at the opposite end to a bottom side of flange portions of the roof bow 24 to support the roof bow 24.

The roof bow 24 may also be secured to the vehicle body structure 10 by a cross brace 28 connecting a central region of the roof bow 24 to a rear region of the vehicle body structure 10.

Figures 2, 3:
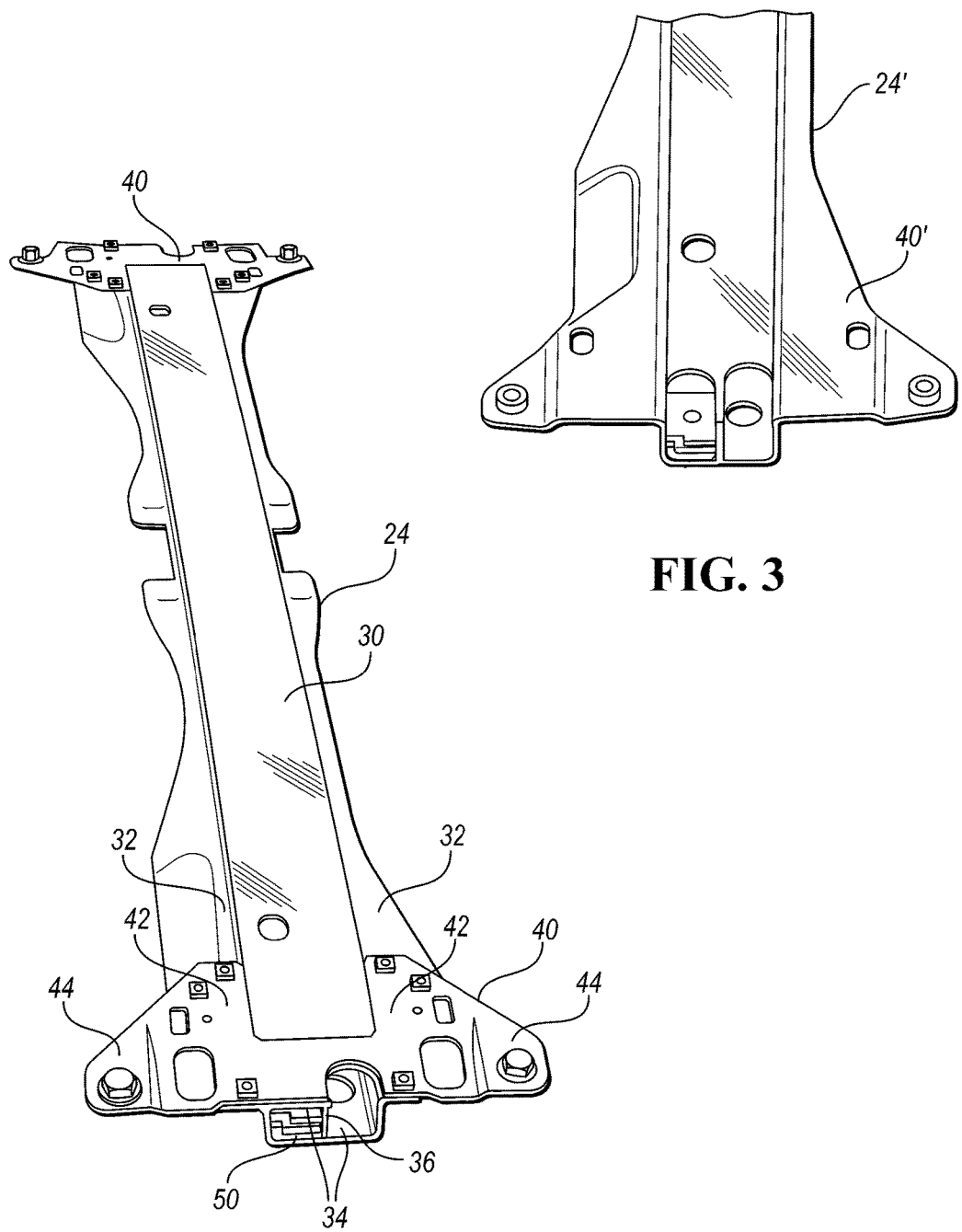
FIG. 2 is a perspective view of components of the roof support assembly structure shown in FIG. 1.
FIG. 3 is a perspective view of another roof support assembly structure.
Figure 4:
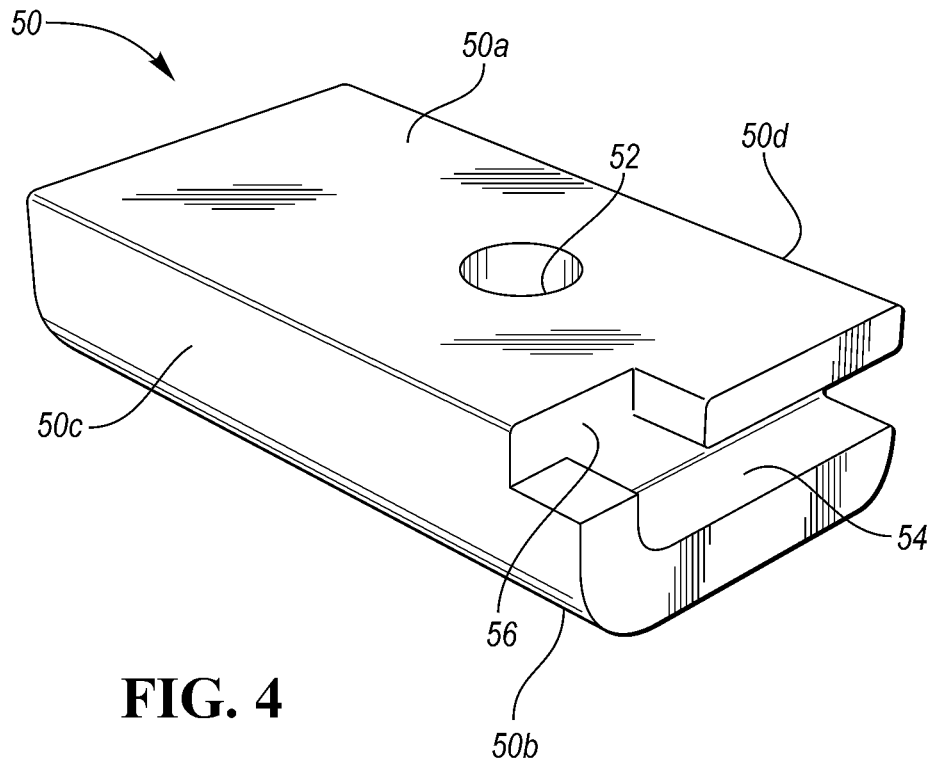
FIG. 4 is a perspective view of a threaded insert.
Figure 5:
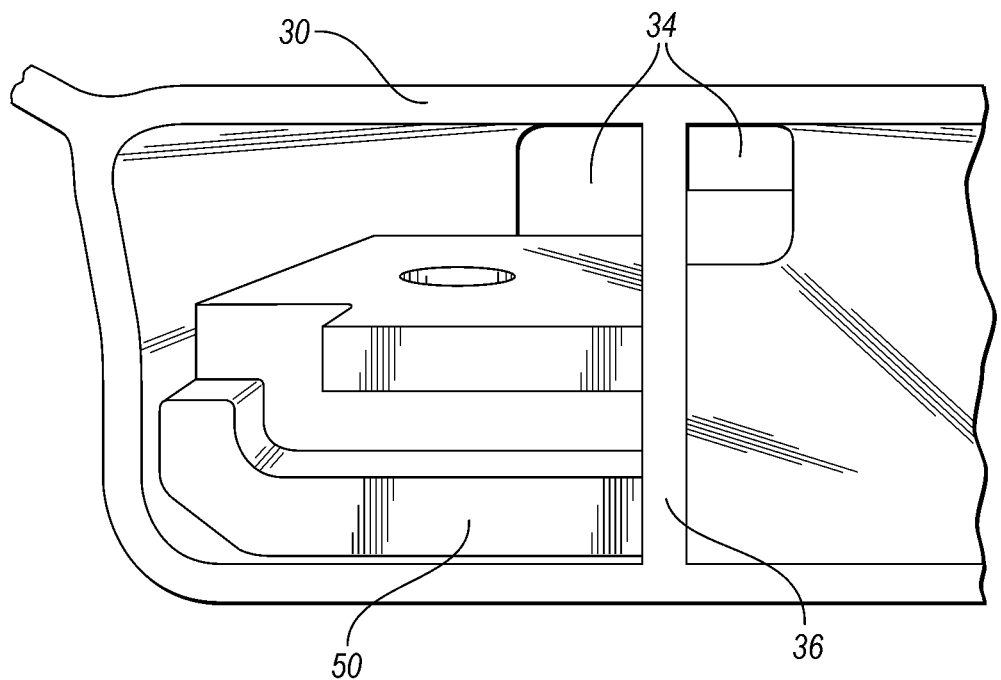
FIG. 5 is an enlarged perspective view of a threaded insert disposed within a roof bow.

Referring momentarily to FIG. 2, the roof bow 24 includes a longitudinal body portion 30 and flange portions 32 extending from the body portion 30. The body portion 30 defines at least one, and preferably two inner channels 34. The inner channels 34 may be separated by an inner channel wall 36. The flange portions 32 include planar regions at which the roof bow 24 may be secured to the handoff brackets 22.

The roof support assembly 20 may also include a reinforcement brace 40 for further securing the roof bow 24 to the handoff brackets 22. In the approach shown in FIGS. 1 and 2, the reinforcement brace 40 is a discrete member secured to a top side of the roof bow 24. As shown in FIG. 2, a reinforcement brace 40 is preferably disposed at each opposing end of the roof bow 24. The reinforcement brace 40 may be formed of stamped high strength steel or other suitable material.

The reinforcement brace 40 is preferably secured to the top side of the flange portions 32 of the roof bow 24 at inner flange regions 42 of the reinforcement brace 40. The reinforcement brace 40 is preferably secured to the roof bow 24 using fasteners comprised of nuts and bolts. Other suitable fasteners or methods of fastening may be used.

As shown in FIG. 1, the reinforcement brace 40 is also secured to the handoff bracket 22. The reinforcement brace 40 is preferably secured to the handoff bracket 22 through weld nuts disposed at an outer flange region 44 of the reinforcement brace 40. In a preferred approach, each outer flange region 44 is rigidly secured to the handoff bracket 22 through at least one fastener such as an M10 bolt. Other suitable fasteners or methods of fastening may be used. In this way, the discrete reinforcement brace 40 provides additional points of securement to robustly affix the roof bow 24 to the handoff bracket 22, and in turn, to the vehicle body structure 10.

In another approach shown in FIG. 3, the reinforcement brace 40' is integrally formed with the roof bow 24'. The integral, one-piece roof bow 24' and reinforcement brace 40' structure may be formed, for example, of extruded aluminum.

During a side impact, the central region of the body portion 30 of the roof bow 24 may experience higher shear and peel loads than the flange portions 32 of the roof bow 24. In this regard, and referring now to FIGS. 4-7, the roof support assembly 20 further includes an insert block 50 disposed within an inner channel 34 of the body portion 30 of the roof bow 24. In a preferred approach, two insert blocks 50 are disposed in a roof bow 24, with one insert block 50 disposed at each end of a common inner channel 34. In another approach, four insert blocks 50 are disposed in a roof bow 24, with a first set of insert blocks 50 disposed at each end of a first inner channel 34 and a second set of insert blocks 50 disposed at each end of a second inner channel 34. In still other approaches, two or more insert blocks 50 may be disposed at an end of an inner channel 34.

The insert block 50 is preferably formed of extruded aluminum (although other suitable materials may be used). The insert block 50 includes a top surface 50a and a bottom surface 50b opposite the top surface 50a. The insert block 50 further includes opposing side surfaces 50c, 50d. The bottom surface 50b extends between the opposing side surfaces 50c, 50d.

The size and geometry of the insert block 50 is optimized to coordinate with an internal profile of the inner channel 34 of the roof bow 24. In a preferred approach, the bottom surface 50b and side surfaces 50c, 50d of the insert block 50 are in contact with, and more preferably, sit substantially flush against, the inner walls of the inner channel 34.

The contact surface area between the side surfaces 50c, 50d and the inner walls of the inner channel 34 is preferably optimized to facilitate load transfer. For example, in one approach, the height of the insert block 50 is approximately half of the height of the inner channel 34. In this approach, the top surface 50a is spaced from a top wall of the inner channel 34. In another approach, the height of the insert block 50 substantially corresponds to an interior height of the inner channel 34. In this approach, the top surface 50a is substantially proximate, immediately adjacent, or even engagement with the top wall of the inner channel 34. As will be appreciated, an increased contact area may permit optimal transfer of load from the insert block 50 to the inner channel 34 of the roof bow 24.

The contact surface area between the surfaces of the insert block 50 and the inner walls of the inner channel 34 may be further increased by optimizing the length of the insert block 50. The insert block 50 preferably has a length of at least one inch, and more preferably, at least two inches. The length of the insert block 50 preferably corresponds to a dimension of the handoff bracket 22. For example, where the handoff bracket 22 includes a flange that extends four inches from the roof rail 12, an insert block 50 having a length of approximately four inches may be used.

The insert block 50 includes a threaded aperture 52 extending from the top surface 50a of the insert block 50 to the bottom surface 50b of the insert block 50. The threaded aperture 52 includes at least one thread extending about at least a portion of the central axis of the threaded aperture 52. In this way, the threaded aperture 52 may receive a threaded fastener, such as an M10 fastener, as described in greater detail elsewhere herein.

The insert block 50 may also include a channel region 54 to facilitate placing the insert block 50 within the inner channel 34 of the roof bow 24. The insert block 50 may also include a notch region 56 to facilitate securing the insert block 50 in place within the inner channel 34 of the roof bow 24.

During manufacture, the insert block 50 is slid into place within the inner channel 34 of the body portion 30 of the roof bow 24 such that the threaded aperture 52 is placed in axial alignment with the aperture 38 disposed through the bottom wall of the body portion 30. That is, the substantially hollow inner channel 34 receives a discrete component within the inner channel 34.

Figure 6:
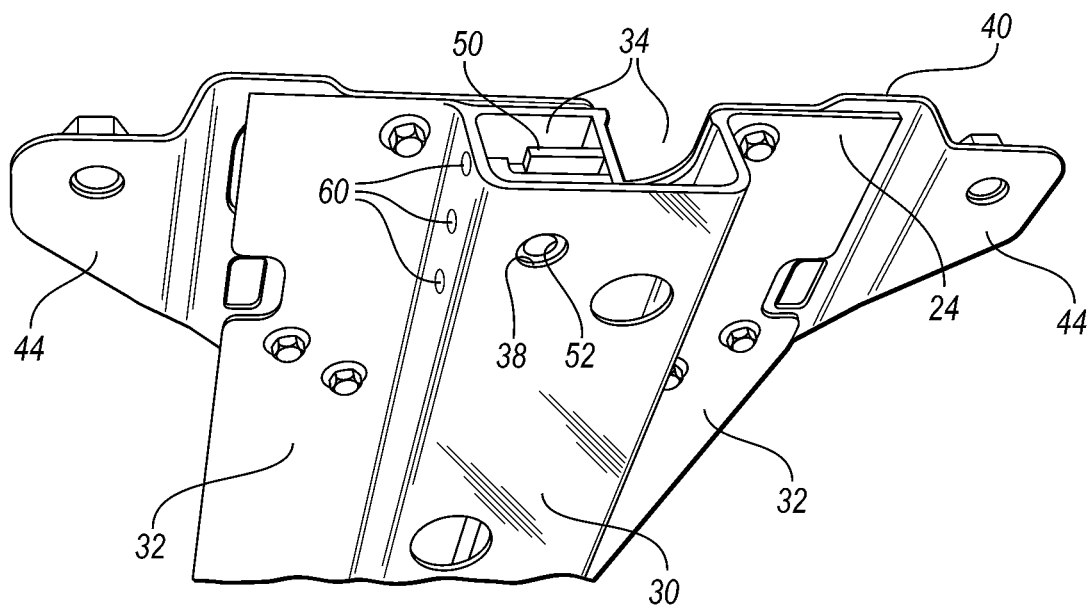
FIG. 6 is bottom perspective view of the components of FIG. 2.
Figure 7:
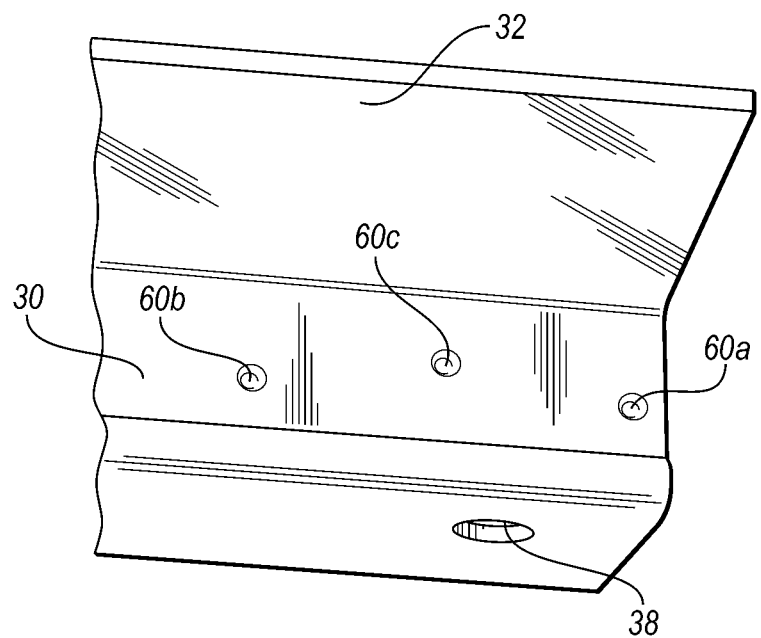
FIG. 7 is a side view of a roof bow.

As apparent in FIGS. 6 and 7, once the insert block 50 is in place within the inner channel 34, at least one, and preferably three locator depressions or dimples 60 may be introduced (e.g., via stamping or punching) into the body portion 30 of the roof bow 24. More specifically, dimples 60 may be formed in a side wall of the body portion 30, thereby effecting a deformation on an interior surface of the side wall. The deformation formed on the interior surface of the side wall acts to inhibit movement of the insert block 50 within the inner channel 34.

For example, a first dimple 60a may be introduced into an exterior surface of a side wall of the inner channel 34 such that a bulge or deformation is formed on an opposite interior surface. In a preferred approach, the first dimple 60a is formed below a height of the top surface 50a proximate the notch region 56 of the insert block 50. In this way, the opposing deformation formed by the first dimple 60a may inhibit the insert block 50 from sliding in a first longitudinal direction (e.g., from sliding out of the opening of the inner channel 34).

A second dimple 60b may similarly be introduced into the exterior surface of a side wall of the inner channel 34. In a preferred approach, the second dimple 60b is formed below a height of the top surface 50a at an end of the insert block 50 opposite the notch region 56. In this way, the opposing deformation formed by the second dimple 60b may inhibit the insert block 50 from sliding in a second longitudinal direction (e.g., from sliding down the length of the inner channel 34).

A third dimple 60c may similarly be introduced into the exterior surface of a side wall of the inner channel 34. In a preferred approach, the third dimple 60c is formed along a central region of the insert block 50 above a height of the top surface 50a. In this way, the opposing deformation formed by the third dimple 60c may inhibit the insert block 50 from sliding in an axial direction (e.g., from separating from the bottom surface of the inner channel 34).

The locator dimples 60 described herein form deformations on an interior surface of the side wall of the inner channel 34. The locator dimples 60 are preferably located such that the resulting deformations are immediately adjacent the insert block 50 to inhibit movement of the insert block 50 within the inner channel 34. In this way, the locator dimples 60 may serve to maintain the threaded aperture 52 of the insert block 50 in proper axial alignment with the aperture 38 disposed through the bottom wall of the body portion 30.

The deformations resulting from the formation of the dimples may take any suitable form. For example, depending on the thickness of the side wall of the body portion 30, the deformations may be distinct projections or protrusions, or may be gradual bulges.

In other approaches, two locator dimples may be introduced into the body portion 30 to maintain the insert block 50 in place. In still other approaches, four or more locator dimples may be introduced into the body portion 30 to maintain the insert block 50 in place. Each locator dimple 60 may have, for example, an outer diameter of 6.0 mm and a depth of 3.0 mm. The locator dimples 60 may be punched into the body portion 30 using any suitable tool.

Figure 8:
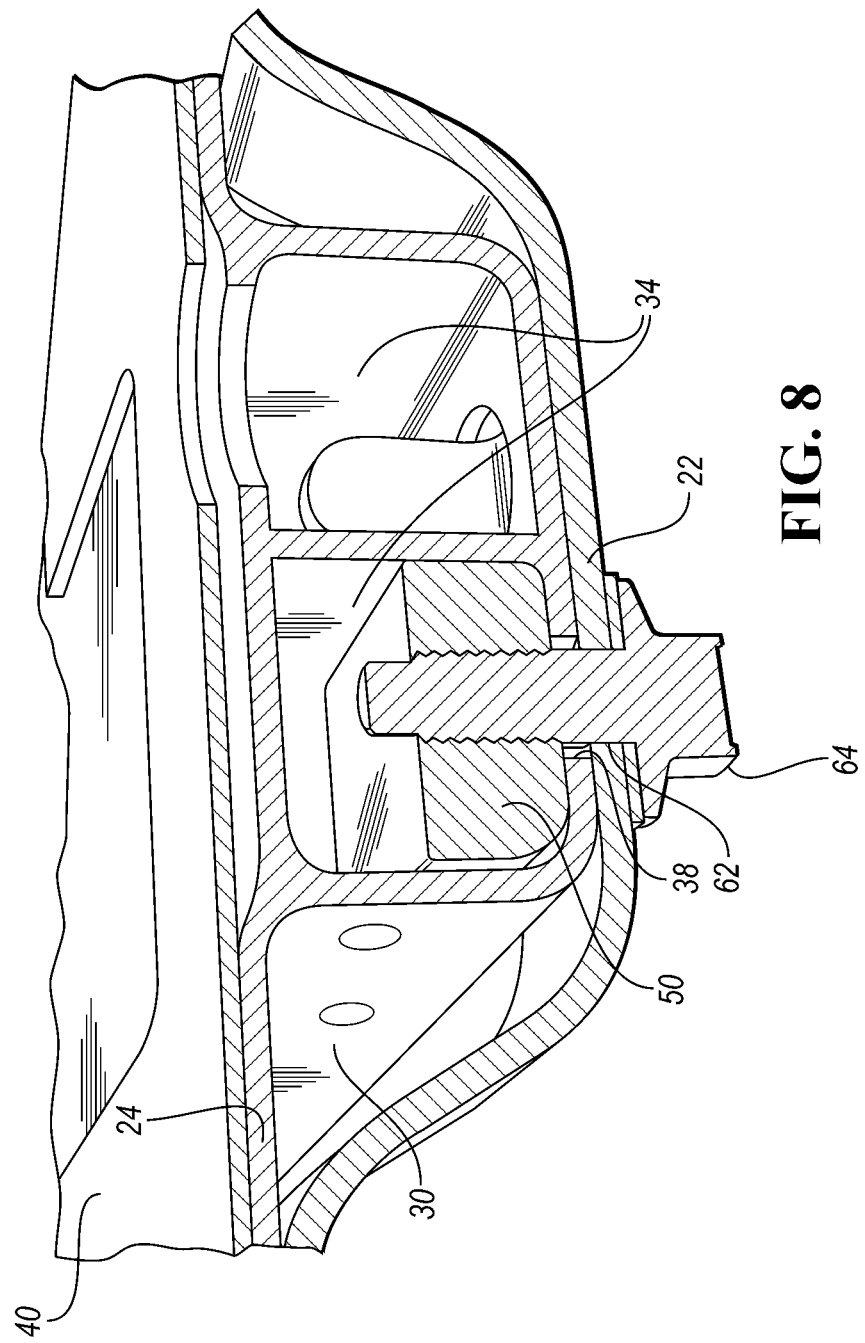
FIG. 8 is a perspective view of components of the roof support assembly structure shown in FIG. 1.

Referring now to FIG. 8, during assembly of the roof support assembly 20, the roof bow 24 is placed on the handoff bracket 22 such that the threaded aperture 52 of the insert block 50, the aperture 38 of the body portion 30 of the roof bow 24, and an aperture 62 of the handoff bracket 22 are all axially aligned. As used herein, the apertures 52, 38, 62 are axially aligned when respective central axes coincide such that an object such as a fastener may consecutively pass through all three of the apertures 52, 38, 62.

When properly aligned, a fastener 64 may be threaded through the aperture 62 of the handoff bracket 22 and the aperture 38 of the roof bow 24 and into the threaded aperture 52 of the insert block 50. In this way, the roof bow 24, including the insert block 50 disposed therein, is rigidly secured to the handoff bracket 22. The insert block 50, now secured within the inner channel 34 of the roof bow 24, may assist in distributing input impact loads into the side walls and bottom surfaces of the inner channel 34 of the body portion 30 of the roof bow 24, and subsequently through the roof support assembly 20.

As described herein, the insert block 50 includes a threaded aperture 52 extending through a thickness of the insert block 50. In a preferred approach, the threaded aperture 52 extends through the entire thickness of the insert block 50. In another approaches (not shown), the threaded aperture extends through less than the entire thickness of the insert block 50. For example, the threaded aperture may extend through half the thickness of the insert block 50.

In still other approaches (not shown), the threaded aperture may extend through a side surface (e.g., surface 50c) of the insert block 50. In such approaches, apertures 38 and 62 may be disposed through side surfaces of the body portion 30 of the roof bow 24 and of the handoff bracket 22, respectively. Other locations and orientations of the coaxial apertures are expressly contemplated herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle roof structure assembly comprising:
   a mounting bracket having a first aperture disposed therethrough, wherein the mounting bracket is adapted to be secured to a roof region of a vehicle;
   a roof bow having a longitudinal body portion defining an inner channel, wherein the longitudinal body portion includes a bottom wall having a second aperture disposed therethrough, and wherein the roof bow is secured to the mounting bracket such that bottom wall engages the mounting bracket and the second aperture is axially aligned with the first aperture;
   a reinforcement bracket secured at an inner region to the roof bow, and secured at an outer region to the mounting bracket;
   an insert block disposed within the inner channel of the roof bow, wherein the insert block defines a third aperture disposed through a thickness of the insert block, and wherein the third aperture is axially aligned with the first aperture and the second aperture; and
   a fastener disposed through the first aperture, the second aperture, and the third aperture to rigidly secure the roof bow to the mounting bracket, and to rigidly secure the insert block to the roof bow.

2. The vehicle roof structure assembly of claim 1, wherein the third aperture is a threaded aperture comprising at least one thread extending about at least a portion of a central axis of the third aperture.

3. The vehicle roof structure assembly of claim 1, wherein a side wall of the longitudinal body portion includes a plurality of deformations extending into the inner channel, and wherein the plurality of deformations inhibits movement of the insert block within the inner channel.

4. The vehicle roof structure assembly of claim 1, wherein the insert block is a first insert block disposed at a first longitudinal end of the longitudinal body portion, further comprising a second insert block disposed at a second longitudinal end of the longitudinal body portion.

5. The vehicle roof structure assembly of claim 1, wherein the reinforcement bracket is a first reinforcement bracket disposed at a first longitudinal end of the longitudinal body portion, further comprising a second reinforcement bracket disposed at a second longitudinal end of the longitudinal body portion.

6. The vehicle roof structure assembly of claim 1, wherein the reinforcement bracket is secured at the outer region to the mounting bracket using at least one bolt.

7. The vehicle roof structure assembly of claim 1, wherein the inner region of the reinforcement bracket is secured to flange portions of the roof bow, and wherein the flange portions protrude from the longitudinal body portion of the roof bow.

8. The vehicle roof structure assembly of claim 1 further comprising an angled brace disposed at an angle relative to the longitudinal body portion of the roof bow having the angled brace secured at one end to the roof bow and secured at the other end to a roof rail at the roof region of the vehicle.

9. The vehicle roof structure assembly of claim 1, wherein the insert block has a length corresponding to a length of a flange of the mounting bracket.

10. A vehicle roof bow assembly comprising:
   a roof bow having a longitudinal body portion defining a substantially hollow inner channel, wherein the longitudinal body portion includes a wall having a first aperture disposed therethrough; and
   an insert block disposed within the inner channel, wherein the insert block defines a second aperture axially aligned with the first aperture.

11. The vehicle roof bow assembly of claim 10, wherein the insert block is a first insert block disposed at a first longitudinal end of the longitudinal body portion, further comprising a second insert block disposed at a second longitudinal end of the longitudinal body portion.

12. The vehicle roof bow assembly of claim 10, wherein the second aperture is a threaded aperture comprising at least one thread extending about at least a portion of a central axis of the second aperture.

13. The vehicle roof bow assembly of claim 10 further comprising a fastener disposed through the first aperture and the second aperture to rigidly secure the insert block to the roof bow.

14. The vehicle roof bow assembly of claim 10, wherein the insert block comprises opposing side walls and a bottom wall extending between the opposing side walls, and wherein the opposing side walls and the bottom wall are disposed in contact with inner walls of the inner channel.

15. The vehicle roof bow assembly of claim 10, wherein the insert block has a height corresponding to approximately at least half a height of the inner channel.

16. A method for securing an insert block within an inner channel of a roof bow for a vehicle roof structure assembly, comprising:
   inserting the insert block within the inner channel; and
   forming at least one dimple on an exterior surface of a side wall of the roof bow to effect a deformation on an interior surface of the side wall to inhibit movement of the insert block within the inner channel.

17. The method of claim 16, wherein inserting the insert block within the inner channel comprises:
   inserting the insert block within the inner channel such that an aperture disposed through the insert block is axially aligned with an aperture of the inner channel.

18. The method of claim 16, wherein forming at least one dimple comprises:
   forming a first dimple into the exterior surface of the side wall to effect a first deformation on the interior surface of the side wall proximate a notch region of the insert block and below a height of a top surface of the insert block, wherein the first deformation inhibits movement of the insert block in a first longitudinal direction.

19. The method of claim 18, wherein forming at least one dimple comprises:
   forming a second dimple into the exterior surface of the side wall to effect a second deformation on the interior surface of the side wall below the height of the top surface of the insert block, wherein the second deformation inhibits movement of the insert block in a second longitudinal direction.

20. The method of claim 19, wherein forming at least one dimple comprises:
   forming a third dimple into the exterior surface of the side wall to effect a third deformation on the interior surface of the side wall above the height of the top surface of the insert block, wherein the third deformation inhibits movement of the insert block in an axial direction.

* * * * *